United States Patent [19]

Groombridge

[11] 3,901,265
[45] Aug. 26, 1975

[54] COMBINATION VALVE VACUUM BREAKER WITH CO-ACTING VALVE IN A LIQUID FLOW PATH

[76] Inventor: Betty Irene Groombridge, 23, The Avenue, Welwyn, England

[22] Filed: Oct. 4, 1973

[21] Appl. No.: 403,716

Related U.S. Application Data

[62] Division of Ser. No. 329,348, Feb. 5, 1973, abandoned.

[30] Foreign Application Priority Data

Feb. 3, 1972 United Kingdom................ 5087/72

[52] U.S. Cl. ............. 137/218; 137/512; 137/525.1
[51] Int. Cl.² .......................................... F16K 45/00
[58] Field of Search ........ 137/512, 525.1, 218, 215, 137/216, 216.1, 216.2, 217

[56] References Cited
UNITED STATES PATENTS

| | | |
|---|---|---|
| 2,322,631 | 6/1943 | Groeniger........................... 137/218 |
| 2,986,098 | 5/1961 | Trout et al................... 137/525.1 X |
| 3,155,107 | 11/1964 | Woodford............................ 137/218 |
| 3,463,159 | 8/1969 | Heimlich........................ 137/525.1 X |
| 3,572,375 | 3/1971 | Rosenberg........................... 137/512 |
| 3,754,709 | 8/1973 | Laatsch............................ 137/218 X |

Primary Examiner—William R. Cline
Attorney, Agent, or Firm—Holman & Stern

[57] ABSTRACT

Fluid flow control devices which permit fluid to flow therethrough in one direction only especially in a ballcock arrangement for use in a cistern in which the supply water is discharged below the cistern water level, with risk of back-siphonage being avoided by the provision of a collapsible sleeve of impermeable material forming a portion of the discharge passage and permitting flow only in one direction while the sleeve is distended. Attempted flow reversal results in the collapse of the tube and blocking of the passage.

3 Claims, 2 Drawing Figures

COMBINATION VALVE VACUUM BREAKER WITH CO-ACTING VALVE IN A LIQUID FLOW PATH

This is a divisional, of application Ser. No. 329,348, filed Feb. 5, 1973 now abandoned.

BACKGROUND OF THE INVENTION

This invention is concerned with improvements in or relating to fluid flow control devices of the type which permit fluid to flow therethrough in one direction only; such devices are referred to in the following specification as one-way valves.

The invention is particularly concerned with one-way valves for use in water supply lines, but it is generally applicable to any analogous system in which fluid is to flow in one direction only.

SUMMARY OF THE INVENTION

The fluid flow control device for the control of a flow of fluid through the device in one direction only, comprises a flow passage and a collapsible sleeve of a flexible and impermeable material arranged in a flow path of the fluid, mounting means to secure one end of the sleeve in a fluid-tight manner to a wall surface of said flow passage, so that said end portion is held open, the arrangement being such that fluid flowing in a normal direction enters the sleeve at said open end portion and distends the remainder of the sleeve while any reversal of the flow causes the tube to collapse and interrupt the flow passage.

The sleeve may be of any suitable flexible and impermeable material; it will also be resilient and so formed that in its relaxed condition, the aforesaid flow passage is closed. In the case of a one-way valve for a water supply line, the sleeve is conveniently a sheet of plastic material, e.g. polyethylene Vinyl Acetate sheet folded once and welded so as to form a sleeve or tube which lies flat, i.e. with the passage therethrough closed, in the as-formed condition.

One particular application of a one-way valve in accordance with the invention is in a so-called ball-cock for use in a domestic water cistern to control the flow of water into the latter from a water main. Present domestic water regulations are such that it is not permissible to fit a ball-cock which discharges water below the water level unless the ball-cock is so constructed as to prevent siphonage from the cistern to the water main by way of the discharge pipe.

Since an under-water discharge level is desirable to reduce the noise of operations, it will be appreciated that such regulations are met merely by the provision of a collapsible tube, as provided by the invention, associated with the discharge pipe and having its free end portion below the water level.

However, there will be hereinafter described by way of example of the invention a ball-cock arrangement having two one-way valves.

DETAILED DESCRIPTION OF THE INVENTION

Figure 1:
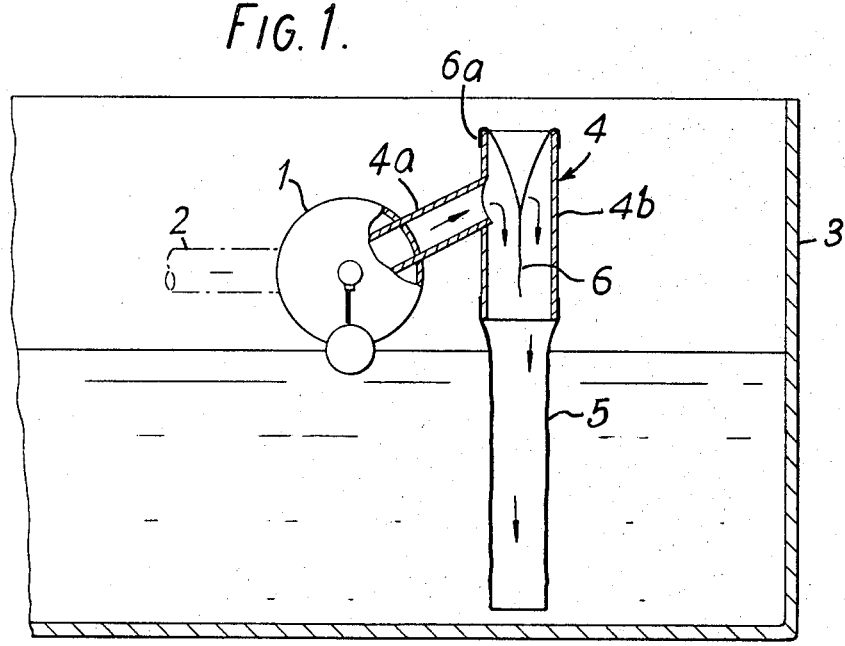
FIG. 1 is a view partly in elevation and partly in cross section showing a ball-cock arrangement with water flowing in a normal direction.

In the ball-cock arrangement shown in the accompanying drawings, two one-way valves being devices in accordance with the invention are utilized; one of these is arranged to constitute a discharge pipe from the ball-cock arrangement and has its normal direction of fluid flow from the water main into the cistern, and the other one-way valve is connected into the ball-cock so that its normal direction of fluid flow is from atmosphere into the water main. The arrangement not only prevents water returning to the main from the cistern in the event that the pressure in the main falls, but also admits air into the main in such an event, thereby breaking any tendency to form a partial vacuum in the ball-cock arrangement.

In the drawings, the ball-cock itself is indicated generally at 1, and a feed pipe 2 leads from a water main (not shown) to the ball-cock and the latter controls the water level in a cistern 3.

FIG. 1 shows the conditions which exist when water is flowing normally from the main into the cistern 3. Water leaves the ball-cock and flows into an upwardly inclined tubular side-arm 4a of a branched T-piece 4, with a main body portion 4b of the T-piece 4 being arranged vertically and extended downwardly by a length of polyethylene Vinyl Acetate sleeve 5 which is fitted around the lower end of the body portion 4b and, as can be seen, extends towards the bottom of the cistern 3. This sleeve constitutes a first one-way valve and water flowing through the side arm 4a enters the sleeve 5 wherein it is held open by the body portion 4b of the T-piece and passes downwardly into the cistern 3 via the sleeve 5 which is held open by the water flowing therethrough.

A second of the valves is constituted by a length of polyethylene vinyl acetate sleeve 6 which is arranged within the body portion 4b of the T-piece 4 and is fixed in place by means of a cuff portion 6a which is engaged around the upper end of the body portion 4b.

When water is flowing normally into the cistern 3, the water pressure which exists within the T-piece 4 tends to force water upwardly through the body portion 4b; this causes the sleeve 6 to collapse so that water only enters the cistern downwardly through the sleeve 5.

Figure 2:
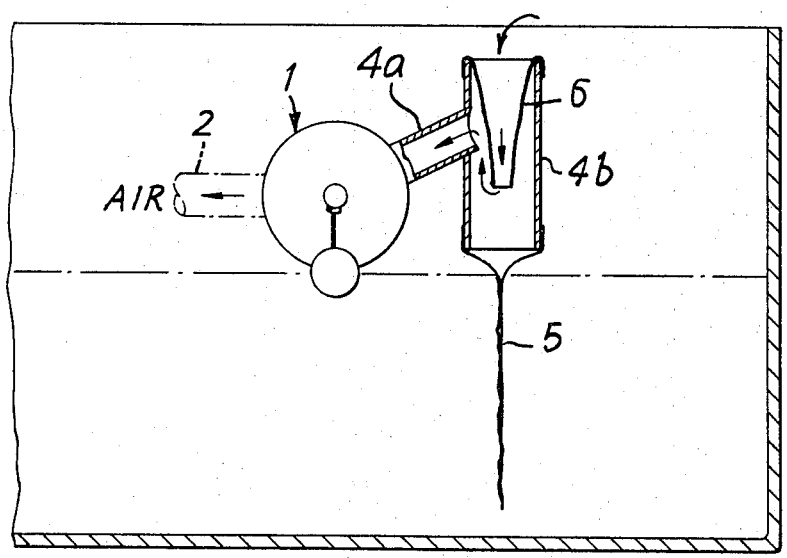
FIG. 2 is a view similar to FIG. 1 showing the arrangement when there is an attempted reversal of flow direction.

However, if the pressure in the water main, and hence in the feed pipe 2, falls to such a level that there is a tendency for water to be siphoned back from the cistern into the main, the conditions shown in FIG. 2 occur. The sleeve 5 is collapsed so that no water can flow therethrough into the ball-cock 1. In addition, the partial vacuum which is set up in the T-piece 4 causes air to open the sleeve 6 and pass, in the direction indicated by the arrows, back into the main.

In the particular embodiment shown, the first mentioned one-way valve is arranged to constitute a discharge pipe of the ball-cock; this is advantageous in that its operation can be checked at any time by inspection, and it is simple to replace in the event that it should wear. In addition, devices in accordance with the invention are silent in operation.

What is claimed is:

1. A liquid flow control device for controlling the pressurized flow of liquid in a single direction from a water main to a cistern containing a body of liquid open to the atmosphere and preventing back flow of the liquid when atmospheric pressure on the body of liquid exceeds the pressurized flow of liquid, said device including, in combination: a flow passage comprising a piece (4) having three interconnected, communicating branches, a first branch thereof (4b) comprising a pressurized-liquid outlet portion for directing the pressurized liquid into the body of water in the cistern, a second branch (4a) thereof comprising a pressure inlet portion for the liquid from the water main, and a third branch thereof open to the atmosphere and defining an atmospheric vent portion; a first collapsible valve sleeve of a flexible impermeable material freely depending from said first branch whereby the lower distal end of the flexible sleeve will be immersed in the body of water in the cistern and emmission of pressurized liquid into the body of liquid in the cistern is substantially silenced by the body of liquid, said first valve sleeve being secured at one end thereof in a fluid-tight manner about the end of said first branch, spaced from the third branch, such that said one end of said first valve sleeve is held open, whereby pressurized liquid flowing in a normal direction through said first branch defining said outlet portion enters said first valve sleeve at said open end thereof and distends the remainder of said sleeve to cause pressurized liquid to enter the body of liquid in the cistern, with reversal of the direction of liquid effecting a collapse of the first valve sleeve and an interruption of said flow passage and preventing back-syphoning of the body of liquid from the cistern; and a second collapsible valve sleeve of flexible and impermeable material freely suspended into said flow passage and open to the atmosphere at one end, said second valve sleeve being secured at one end thereof in a fluid-tight manner about the end of said third branch and having a distal end above the body of liquid in the cistern whereby said one end is retained open to atmospheric pressure, and said second valve sleeve is in a normally collapsed closed condition during normal pressurized liquid flow into the cistern due to the pressure-differential between the atmosphere and the pressurized liquid thereby closing said third branch atmospheric vent, with reversal of the direction of liquid flow and subsequent collapse of said first valve sleeve further causing said second valve sleeve to be distended by ambient atmospheric pressure to open said third branch to said second branch to interrupt any back-syphoning of the body of liquid from the cistern to the said second branch.

2. The structure as claimed in claim 1 in which said first and third branches are in axial alignment, said valve sleeve depending in substantial axial alignment, said second branch communicating intermediately of said first and third branches.

3. The device defined in claim 1, wherein the length of said first sleeve is at least approximately twice the diameter of said first branch.

* * * * *